United States Patent [19]

Lee et al.

[11] Patent Number: 5,039,543

[45] Date of Patent: Aug. 13, 1991

[54] PREPARATION OF FLAVORS

[75] Inventors: Eldon C. Lee, New Milford; John S. Tandy, Litchfield, both of Conn.

[73] Assignee: Nestec S.A., Vevey, Switzerland

[21] Appl. No.: 614,829

[22] Filed: Nov. 16, 1990

[51] Int. Cl.$^5$ ............................................. A23L 1/231
[52] U.S. Cl. .................................... 426/533; 426/650
[58] Field of Search ......................................... 426/533

[56] References Cited

U.S. PATENT DOCUMENTS 3,394,017 7/1968 Glacino .
4,604,290 8/1986 Lee et al. .

FOREIGN PATENT DOCUMENTS 836694 6/1960 United Kingdom .

OTHER PUBLICATIONS

Pearson et al., "Mechanism Responsible for Warmed-Over Flavor in Cooked Meat", Adv. Food Res. 23: (1977), pp. 288-300.
Szujah and List, "Lecithins", Chapter 15, pp. 347-371, 1985 by American Oil Chemists Society.

*Primary Examiner*—Joseph Golian
*Attorney, Agent, or Firm*—Vogt & O'Donnell

[57] ABSTRACT

Flavorants are prepared by heating an aqueous mixture of a phospholipid and a sulfur-containing compound which is reactive with the phospholipid to react the phospholipid and sulfur-containing compound to produce a flavorant. The aqueous mixture also may include a lipid material, amino acids, including those provided by a protein hydrolysate or other source of amino acids, and a reducing sugar.

14 Claims, No Drawings

PREPARATION OF FLAVORS

BACKGROUND OF THE INVENTION

This invention pertains to the field of process flavorants and particularly pertains to process flavorants which impart cooked meat flavor to foodstuffs. More specifically, the present invention is concerned with the preparation of meat flavorants having increased characteristic meat flavor and aromatic intensity which more closely resemble the natural flavor and aroma of cooked meat.

The importance of the Maillard reaction in meat flavor has long been recognized. A large number of patents for "reaction product" meat-like flavorants has been claimed based on the Maillard reaction following the classic patent of Morton et. al. in 1960 (British Patent No. 836,694) which described the production of a meat-like flavor by heating a mixture of cysteine and ribose. The subsequent patents for meat-like flavorants involved sulfur, particularly sulfur-containing amino acids and thiamine. The major precursors of meat flavor for the Maillard reaction of amino compounds and reducing sugars are water-soluble components and the resulting heterocyclic compounds have been shown to be particularly important in meat-like flavors. However, these meat-like flavors still lack specific species characterizing meat aromas.

U.S. Pat. No. 3,394,017 describes the preparation of a meat-like flavorant by reacting thiamine with a sulfur-containing polypeptide or an amino acid and thereafter adding aldehydes and ketones to the products. The addition of aldehydes and/or ketones in an effort to enhance the organoleptic profile of the flavorant produced is generally uneconomical. The chemical-sense substances are also not preferred by consumers.

Lee, et. al. U.S. Pat. No. 4,604,290 enhanced the specific meat aromas of meat flavorants by heating and oxidizing a lipid material to form aldehydes and ketones. The thermal degradation and oxidation of lipids may contribute to desirable flavor.

The two main types of flavor generating reactions which occur thermally are the Maillard reaction of water-soluble amino compounds and reducing sugars, and the thermal degradation and oxidation of oil-soluble lipids. However, the water-soluble and oil-soluble precursors and/or intermediates can not react with each other due to their insolubility.

The role of phospholipids in the development of undesirable warmed-over flavor in reheated meat has been reported (Pearson et. al. Adv. Food Res. 23: 1, 1977), but their possible role in the development of desirable flavors has been largely unexplored. Sessa, D. J. reviewed the role of phospholipids in causing flavor problems (Szujah and List, *lecithins*, Chapter 15, p. 347, 1985 by American Oil Chemists' Society) and suggested (a) phospholipids containing the ester-bound, oxidatively deteriorated fatty acids can possess off-flavors themselves; (b) phospholipids provide a source of polyunsaturated fatty acids for subsequent oxidative deterioration to produce off-flavor; and (c) the amine base portion of the phospholipid can interact with the reactive carbonyl compounds resulting from polyunsaturated fatty acids to yield carbonyl-amine compounds with off-flavor.

SUMMARY OF THE INVENTION

We have surprisingly found that phospholipids can be used in a process for preparing flavorants which impart a cooked meat flavor with a characterising species aroma to foodstuffs which avoids substantially all of the disadvantages that may be associated with the prior art flavorants discussed above.

Accordingly, the present invention provides a process for preparing a process flavourant which comprises heating an aqueous mixture of a phospholipid and a sulphur-containing compound at an elevated temperature.

The water may be present in a quantity varying from 5 to 95%, preferably from 50% to 85% by weight based on the total weight of the reaction mixture.

The process is preferably an aqueous microemulsion reaction.

DETAILED DESCRIPTION OF THE INVENTION

The phospholipids that are employed in the present invention are preferably derived from animal origin. The phospholipids of animal origin may be derived from a variety of different sources such as egg yolk, buttermilk, and cerebrospinal fluid. Egg yolk extracts may contain phospholipids, neutral lipids, cholesterol, water, and oxidized material. The phospholipids in commercially available egg yolk extracts may contain predominantly phosphatidylcholine and other phospholipids such as phosphatidylethanolamine and minor sphingomyelin and phosphatidylinositol. The polar lipids isolated from buttermilk and cerebrospinal fluid may contain phospholipids and glycolipids. The amount of phospholipid may be from 0.05% to 10%, preferably from 0.1% to 5% by weight based on the total weight of the reaction mixture.

Applicants have found that egg yolk phospholipids, especially egg yolk lecithin or phosphatidylcholine, develop the most desirable meat aromas among the phospholipids of animal origin, and the phospholipids with higher contents of phosphatidylcholine give more promising and cleaner characteristic meat aromas. The content of phosphotidylcholine in egg yolk phospholipids for developing promising meat aromas is preferably more than 60%.

The sulfur-containing compounds that are employed in the present invention may be the precursors of sulfur-containing heterocyclic flavour compounds such as, for example, thiazoles, thiophenes or thiazolines and are preferably thiamine, cysteine or cystine. Suitable sulfur-containing compounds include, but are not limited to, thiamine and sulfur-containing amino acids, which liberate hydrogen sulfide, lower alkyl mercaptans, or lower alkyl sulfides or disulfides, or may include inorganic sulfur compounds, or hydrogen sulfide itself. Such inorganic sulfur compounds may include the sulfides or hydrosulfides of alkali or alkaline earth metals or ammonium. The amount of sulfur-containing compound may be from 0.1% to 20%, and preferably from 0.5 to 5% by weight based on the total weight of the reaction mixture.

Desirably, a lipid material is employed in the present invention and this may comprise triglycerides, unsaturated fatty acids or a combination thereof and may be preferably derived from a source which is most closely related to the type of flavorant desired. Thus, where it is desired to produce a chicken flavorant, the triglyceride source that is most preferred is chicken fat. Similarly, in the preparation of a fish flavorant, it will be most desirable to employ fish oil as the source of the lipid material. The amount of lipid material may be from 0.2% to 50%, preferably from 1% to 20% by weight based on the total weight of the reaction mixture.

It is most advantageous to add an amino acid source to the reaction mixture in order to even further enhance and intensify the flavorants produced in the present invention. As a source of amino acids, one may employ a single amino acid which is specifically associated with the desired flavorant or a mixture of various amino acids. Protein hydrolysates from vegetable or animal sources may also be employed. Vegetable protein hydrolysates, for example, may be obtained from wheat gluten, wheat germ, corn gluten, soy protein, linseed protein, peanut press cake, yeast and the like. The amount of amino acid source may be from 0.5% to 50%, preferably from 2 to 20% by weight based on the total weight of the reaction mixture.

It is also advantageous to add a reducing sugar to the reaction mixture in order to produce Maillard reaction roast meat flavorants in the present invention. The reducing sugar that is employed in the present invention includes mono-, di-, or oligo-saccharides. The amount of reducing sugar may be from 0.1% to 10%, preferably from 0.5 to 5% by weight based on the total weight of the reaction mixture.

The reaction that is employed in the present invention is carried out at elevated temperatures, which could be as high as 250° C. but, normally, at a temperature in the range of from 60° to 180° C. preferably from 80° to 160° C. and more preferably, in the range of from, 100° to 150° C. for a period of about 1 to 8 hours. Pressure is generated by water vapour during heating and the reaction is preferably carried out under pressure which may be, for example, up to 40 bars at 250° C. but is usually about 4-5 bars at 150° C.

After the reaction has taken place, the flavorant may be used as is, or alternatively, be blended with suitable solvent, thickeners, extenders or carriers such as hydrolyzed plant proteins, malto-dextrin, gum arabic, etc. If desired, flavor potentiators or enhancers such as spices, condiments, monosodium glutamate, 5'-ribonucleotides and the like may also be combined with the resulting flavorant. Alternatively, some of these additives may also be combined with the mixture prior to the reaction step.

The water present in the reaction product may be removed by drying the flavorant material using any conventional means such as spray-drying, vacuum-oven drying, or freeze-drying.

Factors which may affect the nature and quality of the flavorants produced include the nature and relative amounts of the phospholipids, lipid materials, sulfur-containing compounds, amino acids, and reducing sugars as well as the reaction temperature, time and pH of the reaction mixture.

The flavorants of the present invention may be incorporated in soups and soup mixes, casserole dishes, canned and frozen human foods, animal or pet foods, sauces, gravies, stews, simulated meat products, meat spreads and dips, bakery products, replacements for beef, chicken, pork, fish and seafood extracts, and the like.

The amount of a particular flavorant employed will be dependent upon the specific application. Generally, an amount of 0.1 to 5.0% by weight of a flavorant produced by the present invention and preferably, about 0.5 to 1.0% by weight is usually enough to impart a desirable cooked meat flavor and aroma to the foodstuff.

EXAMPLES

The following examples further illustrate the present invention. Parts and percentages are given by weight.

EXAMPLE 1

This Example is illustrative of an embodiment of the present invention in which the simple model systems of L-cysteine hydrochloride (a sulfur-containing compound), monosodium glutamate (an amino acid), and chicken fat (a lipid material) are thermally reacted in the presence or absence of xylose (a reducing sugar) with egg yolk phospholipids to demonstrate the criteria of animal phospholipids for producing specific meat aromas as follows:

L-Cysteine hydrochloride: 2.0 parts
Monosodium glutamate: 5.0 parts
Chicken fat: 5.0 parts
Phosphophate buffer: 0.1M potassium dihydrogen phosphate, pH adjusted at 7.0 with 0.1N sodium hydroxide
Xylose: 1 part (presence or absence)
Egg yolk lecithin (Ovothin 160, Lucas Meyer, Inc.): 1 part
Water: 86.0 parts The reaction of the above mixture is carried out at the temperature of 140° C. under pressure for 1 hour. The reaction mixture after cooling is organoleptically evaluated. The resulting flavorant with phospholipids has chickeny, oily notes whereas a comparative control without phospholipids gives sulfurous, rubbery notes.

Gas chromatographic analysis of volatiles showed that the flavorants with phospholipids in the presence or absence of xylose produce more volatiles with the presence of high retention time compounds than the similar flavorants prepared without phospholipids.

EXAMPLE 2

This Example is illustrative of an embodiment of the present invention in which a flavoring agent containing a series of egg yolk lecithins and having the characteristic flavor and aroma of cooked beef is prepared from the following constituents:

Egg yolk lecithin (Ovothin 120, 160, 170, 180, and 200, Lucas Meyer, Inc.): 0.5 parts
Thiamine hydrochloride: 2.0 parts
Maggi hydrolyzed plant protein HPP 4BE: 10.0 parts
Xylose: 1.0 part
Beef tallow: 5.0 parts
Water: 82.0 parts The series of egg yolk lecithins, ovothin 120, 160, 170, 180 and 200 (Lucas Meyer, Inc.), are classified based on the approximate content of phosphatidylcholine, 20%, 60%, 70%, 80%, and minimum 94% respectively. They may contain other phospholipids, neutral lipids, cholesterol, fatty acids, oxidized materials, and moisture. The reaction of the above mixture is carried out in a microemulsion state at the temperature of 130° C. under pressure for 2 hours. The reaction mixture after cooling is blended with 0.25 parts 5'-ribonucleotides (TAKEDA RIBOTIDE), pH adjusted at 5.3, homogenized with 40 parts malto-dextrin (LODEX 10), and then spray-dried to a powder containing less than 4 percent moisture.

The resulting flavorant has the characteristic flavor and aroma of roast beef. Compared to a similar flavorant prepared without the egg yolk lecithins, the flavorant of this Example has richer, more balanced and fullbodied beefy flavor notes. Gas chromatographic analysis of volatiles also confirm that the flavorant of this Example produces more volatiles with higher retention time compounds than the similar flavorant prepared without the egg yolk lecithin.

It is found that a higher content of phospholipids, particularly phosphatidylcholine, gives more promising and cleaner characteristic beefy aroma and flavor.

EXAMPLE 3

This Example illustrates the embodiment of the present invention wherein the phospholipids employed are derived from buttermilk or cerebrospinal fluid instead of egg yolk. The compositions of the chromatographically purified buttermilk polar lipids are 55–62% phospholipids, 38–45% glycolipids and 1–3% dialysable material, and cerebrospinal polar lipids are 63–66% phospholipids and 34–37% glycolipids, respectively. A similar procedure to that described in Example 2 was carried out and a characteristic meat and aroma flavor was produced.

EXAMPLE 4

This Example illustrates the embodiment of the present invention in which a flavoring agent having the characteristic flavor and aroma of cooked chicken is prepared from the following constituents:

Egg yolk lecithin (OVOTHIN 160, Lucas Meyer Inc.): 0.5 parts
L-Cysteine hydrochloride: 2 parts
Monosodium glutamate: 5 parts
MAGGI hydrolyzed plant protein HPP 3H3: 5 parts
Sucrose: 1.0 part
Chicken skin: 5 parts
Chicken fat: 5 parts
Water: 77 parts The reaction of the above mixture is carried out at the temperature of 130° C. under pressure for 1 hour. The reaction mixture after cooling is blended with 0.25 parts 5'-ribonucleotides (TAKEDA RIBOTIDE), pH adjusted at 5.3, homogenized with 40 parts malto-dextrin (LODEX 10), and then spray-dried to a powder containing less than 4 percent moisture.

The resulting flavorant has a richer and more balanced chickeny aroma than a comparative control without phospholipids.

EXAMPLE 5

This Example is illustrative of the embodiment of the present invention in which a flavoring agent having the characteristic flavor and aroma of cooked fish is prepared employing the following constituents:

Egg yolk licithin (OVOTHIN 160, Lucas Meyer, Inc.): 0.5 parts
L-Cysteine hydrochloride: 2 parts
Monosodium glutamate: 5 parts
MAGGI hydrolyzed plant protein HPP 3H3: 5 parts
Cod fish oil: 5 parts
Linoleic acid: 0.3 parts
Dextrose: 1 part
Water: 81.0 parts The reaction of the above mixture is carried out at the temperature of 130° C. for 2 hours. The reaction mixture after cooling is blended with 0.25 parts 5'-ribonucleotides (TAKEDA RIBOTIDE), pH adjusted at 5.3, homogenized with 40 parts malto-dextrin (LODEX 10), and then spray-dried to a powder containing less than 4 percent moisture.

We claim:

1. A process for producing a flavorant comprising heating an aqueous reaction mixture containing a phospholipid of animal origin, which is in an amount of from 0.05% to 10% by weight based upon a total weight of the reaction mixture, and a sulfur-containing compound, which is reactive with the phospholipid upon heating and which is in an amount of from 0.1% to 20% by weight based upon the total weight of the reaction mixture, at a temperature of from 60° C. to 250° C. to react the phospholipid and sulfur-containing compound to produce a flavorant.

2. A process according to claim 1 wherein the phospholipid is contained in a substance selected from the group of phospholipid-containing substances consisting of egg yolk, egg yolk extract, buttermilk and cerebrospinal fluid.

3. A process according to claim 1 wherein the phospholipid is egg yolk lecithin.

4. A process according to claim 1 wherein the phospholipid is phosphatidylcholine.

5. A process according to claim 1 wherein the sulfur-containing compound is a sulfur-containing amino acid.

6. A process according to claim 1 wherein the sulfur-containing compound is a compound selected from the group of sulfur-containing compounds consisting of thiamine, cysteine and cystine.

7. A process according to claim 1 wherein the reaction mixture further comprises a lipid material.

8. A process according to claim 1 wherein the reaction mixture further comprises an amino acid.

9. A process according to claim 1 wherein the reaction mixture further comprises a protein hydrolysate.

10. A process according to claim 1 wherein the reaction mixture further comprises a reducing sugar.

11. A process according to claim 1 wherein the reaction mixture further comprises at least one of a triglyceride, an unsaturated fatty acid, an amino acid, a protein hydrolysate and a reducing sugar.

12. A process according to claim 2 wherein the reaction mixture further comprises at least one of a triglyceride, an unsaturated fatty acid, an amino acid, a protein hydrolysate and a reducing sugar.

13. A process according to claim 1 wherein the reaction mixture is heated to from 100° C. to 150° C. under pressure.

14. A process according to claim 13 wherein the reaction mixture is heated for from 1 hour to 8 hours.

* * * * *